US 8,874,762 B2

(12) United States Patent
Capuozzo et al.

(10) Patent No.: US 8,874,762 B2
(45) Date of Patent: Oct. 28, 2014

(54) SESSION INITIATION PROTOCOL ADAPTOR

(75) Inventors: Giuseppe Capuozzo, Rome (IT); Alessandro Orsano, Rome (IT)

(73) Assignee: Accenture Global Serivces Limited, Dublin (IE)

( * ) Notice: Subject to any disclaimer, the term of this patent is extended or adjusted under 35 U.S.C. 154(b) by 1374 days.

(21) Appl. No.: 11/975,260

(22) Filed: Oct. 18, 2007

(65) Prior Publication Data
US 2008/0320148 A1 Dec. 25, 2008

(30) Foreign Application Priority Data
Jun. 22, 2007 (EP) .................................. 07425389

(51) Int. Cl.
G06F 15/16 (2006.01)
H04L 29/06 (2006.01)
H04L 29/12 (2006.01)
H04L 29/08 (2006.01)

(52) U.S. Cl.
CPC ............ *H04L 65/1069* (2013.01); *H04L 69/08* (2013.01); *H04L 69/24* (2013.01); *H04L 65/1033* (2013.01); *H04L 61/15* (2013.01); *H04L 29/12047* (2013.01); *H04L 29/06027* (2013.01); *H04L 65/1006* (2013.01); *H04L 67/327* (2013.01); *H04L 61/25* (2013.01)
USPC ........................................... 709/228; 709/232

(58) Field of Classification Search
USPC .................... 709/246, 227; 379/90.01, 90.02
See application file for complete search history.

(56) References Cited

U.S. PATENT DOCUMENTS

| 2003/0115332 | A1 | 6/2003 | Honeisen |
| 2005/0047423 | A1* | 3/2005 | Kaul et al. .................... 370/401 |
| 2007/0041528 | A1 | 2/2007 | Menon et al. |
| 2008/0146201 | A1 | 6/2008 | O'Neill et al. |
| 2009/0323636 | A1 | 12/2009 | Dillon et al. |

FOREIGN PATENT DOCUMENTS

| CN | 1423201 A | 6/2003 |
| EP | 1 318 649 | 6/2003 |
| EP | 1318649 A1 | 6/2003 |
| JP | 2006-086557 | 3/2006 |
| JP | 2007-043751 | 2/2007 |
| WO | WO 03/032585 | 4/2003 |

OTHER PUBLICATIONS

Camarillo Ericsson et al: "IPv6 Transition in the Session Initiation Protocol (SIP); draft-ietf-sipping-v6-transition-05.txt" IEFT Standard-Working-Draft, Internet Engineering Task Force, IETF, CH, vol. sipping, No. 5, May 22, 2007, XP015049884 ISSN: 0000-0004.

(Continued)

Primary Examiner — Michael Chao
Assistant Examiner — William G O'Hara
(74) Attorney, Agent, or Firm — Brinks Gilson & Lione

(57) ABSTRACT

A SIP adaptor modifies the format of a session initiation protocol (SIP) message. A SIP message in a first format is received by the SIP adaptor from a first SIP server that is based on the first message format. The SIP adaptor modifies the SIP message to a second format and forwards the modified SIP message to a second SIP server that is based on the second message format. By modifying SIP messages, the SIP adaptor allows communications sessions to be established between clients of SIP servers that utilize dissimilar SIP message formats.

20 Claims, 8 Drawing Sheets

(56) References Cited

OTHER PUBLICATIONS

European Search Report mailed Feb. 27, 2008, for corresponding EPO application No. 07425389.9.
Chinese Office Action dated Apr. 9, 2012, issued in related Chinese Application No. 2008101302855.
Non-Final Office Action (Election/Restriction) dated Apr. 18, 2011, issued in related U.S. Appl. No. 12/234,785.
Non-Final Office Action dated Jun. 3, 2011, issued in related U.S. Appl. No. 12/234,785.
English translated Chinese Office Action for corresponding Application No. CN200810130285.5 dated Jan. 6, 2013.
English translated Chinese Office Action for corresponding Application No. CN200810130285.5 dated Sep. 4, 2013.
English translated Chinese Office Action for corresponding Application No. CN200810130285.5 dated May 3, 2014.

* cited by examiner

SESSION INITIATION PROTOCOL ADAPTOR

RELATED APPLICATION

This application claims benefit under 35 U.S.C. §119 to European patent application no. 07425389.9 filed in the European Patent Office on Jun. 22, 2007, and is incorporated herein by reference.

BACKGROUND

1. Technical Field

This application relates to the field of network communication, and more specifically to initiating a communication session between participants in separate networks that implement dissimilar session initiation protocols.

2. Background Information

A session initiation protocol (SIP) is a signaling protocol used to initiate a communication session between two (or more) participants within an Internet protocol (IP) network, such as a messaging network. The communication session may be a telephone call over the Internet, an instant messaging (IM) session, a multi-media conference session, or other type of communication activity between participants. The participants (initiator and invitee) may interface to the network by way of an application running on a computer, such as an IM client application, or a device, such as an IP phone, as examples. Throughout the specification, unless indicated otherwise, the terms "initiator" and "invitee" refer to a client application, device, or other network communication endpoint, and not the participants themselves. The term "endpoint" refers to one or more interfaces such as a client application, IP phone, or any program (software endpoint), set of programs, device (hardware endpoint), or set of devices that enable participants to communicate with one another within or between network(s).

During the initiation (also referred to as "signaling") phase of a communication session, SIP messaging first occurs between the initiator and a SIP server associated with the initiator's network. To initiate the communication session, the initiator sends a SIP invitation message to the SIP server. The SIP invitation message typically includes the invitee's address as well as a session description. For example, a session description may indicate that the prospective session is a Voice over Internet Protocol (VoIP) telephone session, a video conference session, or other type of media session. The SIP server then communicates the SIP invitation message to the invitee. The SIP invitation message is followed by further SIP messaging between the initiator and the invitee via the SIP server. The SIP messaging provides information that is used to prepare the initiator and the invitee for the communication session.

SIP messaging may also ascertain whether the invitee's address (e.g., IP address) is correct and whether the invitee is available. SIP messaging may indicate that certain of the invitee's computer and/or network resources are required for the communication session and should be reserved if the communication session is going to occur. For example, a video application may need to be accessible and executable at the invitee's computer if SIP messaging indicates that the communication session is a video conference session. In addition, SIP messaging may indicate that computer and/or network resources, such as memory, will have to be allocated to the session to ensure a cohesive communication exchange. If the invitee can satisfy the communication requirements, a SIP message indicating so is sent by the invitee to the SIP server. The SIP server notifies the initiator accordingly. After a session has been initiated, the endpoints exchange data by way of data oriented protocol, such as the IP, without further invoking the SIP or the SIP server unless the session settings are modified or until the session is terminated by the initiator or invitee.

There are different SIP standards. For example, the Internet Engineering Task Force (IETF) has designated RFC 3261 as a SIP standard. RFC 3261 is widely used as a signaling protocol for VoIP and has been evolving and expanding as technologies advance. Other SIP standards exist, such as those that are customized for SIP servers that support specific network domains. For example, Microsoft® utilizes a customized SIP to support the popular Microsoft® Office Communicator (MOC) client. A substantial problem arises because MOC SIP fields are different from the RFC 3261 SIP fields. Thus, a MOC SIP message is not discernable in the RFC 3261 domain, and a RFC 3261 SIP message is not discernable in the MOC domain. Therefore, a communication session cannot be established between a participant in the MOC domain and a participant in the RFC 3261 domain.

There presently exists a need to initiate a communication session between an initiator and an invitee in separate networks that implement dissimilar session initiation protocols. A SIP adaptor solves the technical problem of communicating session information between endpoints in networks that use dissimilar SIP standards.

BRIEF SUMMARY

A session initiation protocol (SIP) adaptor is disclosed. According to one embodiment, the SIP adaptor comprises a proxy server configured to modify the field content of a SIP message received from a first SIP server so that it is compliant with the messaging format of a second SIP server, and therefore discernable to the second SIP server. A transformation protocol may be implemented to modify a SIP message received from the first SIP server so that it conforms to the domain of the second SIP server that is to receive the SIP message. For this purpose, the transformation protocol may include accessing a repository programmed with information about the SIP servers, including transformation and (message) format rules. The rules may include matching SIP message parameters to particular formats, properties and/or actions to be taken. Furthermore, the rules may govern how the SIP message maps to the messaging format of the second SIP server. The rules may specify actions to be taken with respect to one or more parameters, such as parameter deletion, insertion, and modification. An action may thus be implemented to convert any aspect of the SIP message to the message format of the second SIP server.

The transformation protocol may remove parameters (e.g. media types) from the SIP message that are not recognizable to the second SIP server. Alternatively, or in addition, the transformation protocol may modify other aspects of the SIP message so that the message complies with the messaging format of the second SIP server. There are various types of transformations that may be carried out for modifying a SIP message. In some cases, a single transformation may be all that is necessary. In other cases, two or more transformations may be implemented. The various types of possible transformations include adding data fields to the SIP message and/or deleting data fields from the SIP message. Data fields may be converted, expanded, and/or truncated. Data fields may be added around other data fields, shortened, and/or lengthened. A data field may correspond to any part or portion of the SIP message. A transformation may also include changing the encoding format of the SIP message, removing the encoding, or performing some other action.

Accordingly, it is advantageously possible to initiate a communication session between an initiator and an invitee particularly in separate networks implementing dissimilar session initiation protocols. The SIP adaptor thus significantly improves the reliability of communication between different SIP servers operating on different platforms. Furthermore, network traffic may also improve, as well as reliability, speed and effectiveness of the network. Communication may also be enhanced by particularly avoiding unnecessary traffic due to incompatibility of system requirements.

In one adaptor implementation, the SIP adaptor modifies the field content by removing media types from the SIP message that would not be recognized by the second SIP server. The media types to be removed, as well as any other SIP message modifications, are configurable as a parameter of the SIP adaptor.

The proxy server may be an application program, a computer, a computer system, a cluster of computers, or other processing entity. In a preferred version, the proxy server includes an inbound interface, an outbound interface, a core, and a repository. The inbound interface communicates with the first SIP server in accord with the first SIP server messaging format. The outbound interface communicates with the second SIP server in accord with the second SIP server messaging format. The core modifies the SIP messages received from the first SIP server and/or the second SIP server so that each message conforms to the format of the SIP server that is to receive the message. The repository stores information for mapping user and domain names to specific SIP messaging and network formats and for identifying the SIP servers associated with each domain name.

According to one implementation, a SIP adaptor is in communication with a first SIP server having a first SIP server messaging format, and a second SIP server having a second SIP server messaging format. The first SIP server is associated with a first network domain and the second SIP server is associated with a second network domain. A SIP message sent from a client (initiator) in the first domain is received by the first SIP server. The first SIP server references a database to determine if the intended recipient (invitee) has a registered uniform resource identifier (URI). The first SIP server may execute a database query using, for example, the username part or domain part of the URI (e.g., username@domain.com). If the invitee is within the domain of the first SIP server, the query will return information indicating so. The information may include additional identification information pertaining to the invitee to be used to communicate to the invitee. Thus, if the URI is registered, the first SIP server assumes SIP messaging between the client and the recipient.

Accordingly, it is advantageously possible to determine at the first SIP server whether the SIP adaptor is needed and whether a communication channel may be established between the initiator and the invitee via the first SIP server.

If the URI is not registered, the first SIP server routes the SIP message to the SIP adaptor. The SIP adaptor modifies the SIP field content so that the SIP message conforms to the messaging format of the second SIP server. The SIP adaptor may modify the SIP message by implementing any part of or all of the transformation protocol discussed above, as an example. The SIP adaptor then forwards the modified SIP message to the second SIP server. The SIP adaptor assumes a proxy role for further SIP messaging between the client in the first domain (via the first SIP server) and the receiver in the second domain (via the second SIP server).

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION OF THE DRAWINGS AND THE PRESENTLY PREFERRED EMBODIMENTS

Figure 1:
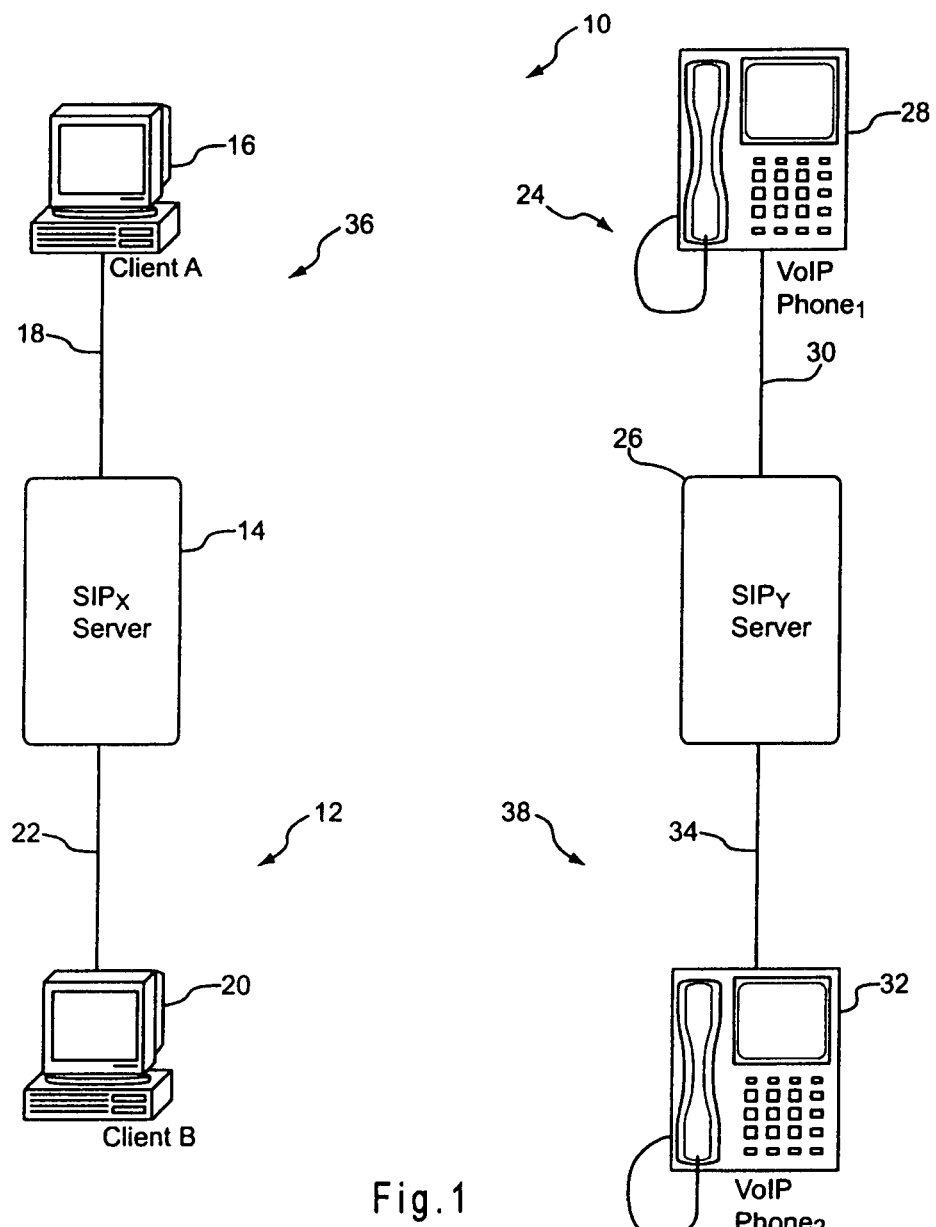
FIG. 1 (prior art) is an illustration showing multiple messaging domains that include at least two messaging domains that use dissimilar session initiation protocols (SIPs).

FIG. 1 illustrates multiple messaging/network domains 10 that include messaging/network domains that use dissimilar session initiation protocols (SIPs). A first SIP server ($SIP_X$) 14 communicates SIP messages in the $SIP_X$ domain. A second SIP server ($SIP_Y$) 26 communicates SIP messages in the $SIP_Y$ domain. In the illustration, the format of messages in the $SIP_X$ domain is different than the format of messages in the $SIP_Y$ domain. It is noted that throughout the specification messaging/network domains refer to client applications and client domains, while SIP domains refer to the SIP messaging format(s) implemented by the SIP servers and the clients. Thus, a client (initiator or invitee) is typically a member of both a messaging/network domain and a SIP domain. Throughout the specification a messaging/network domain may simply be referred to as a messaging domain.

Client A 16 and Client B 20 are endpoints in messaging domains 36 and 12, respectively. The clients 16 and 20 prepare SIP messages 18 and 22 within each messaging domain 36, 12 using the protocol specific to the $SIP_X$ domain. Thus, the $SIP_X$ server 14 may successfully initiate a communications session between Client A 16 and Client B 20.

VoIP phone₁ 28 and VoIP phone₂ 32 are endpoints in messaging domains 24 and 38, respectively. The phones 28 and 32 prepare SIP messages 30 and 34 within each messaging domain 24, 38 using the protocol specific to the SIP$_Y$ domain. Thus, the SIP$_Y$ server 26 may successfully initiate a communications session between VoIP phone₁ 28 and VoIP phone₂ 32. However, because the format of messages in the SIP$_X$ domain is different than the format of messages in the SIP$_Y$ domain, neither the SIP$_X$ server 14 nor the SIP$_Y$ server 26 is able to initiate a communication session between either Client A 16 or Client B 20 and VoIP phone₁ 28 or VoIP phone₂ 32.

Figure 2:
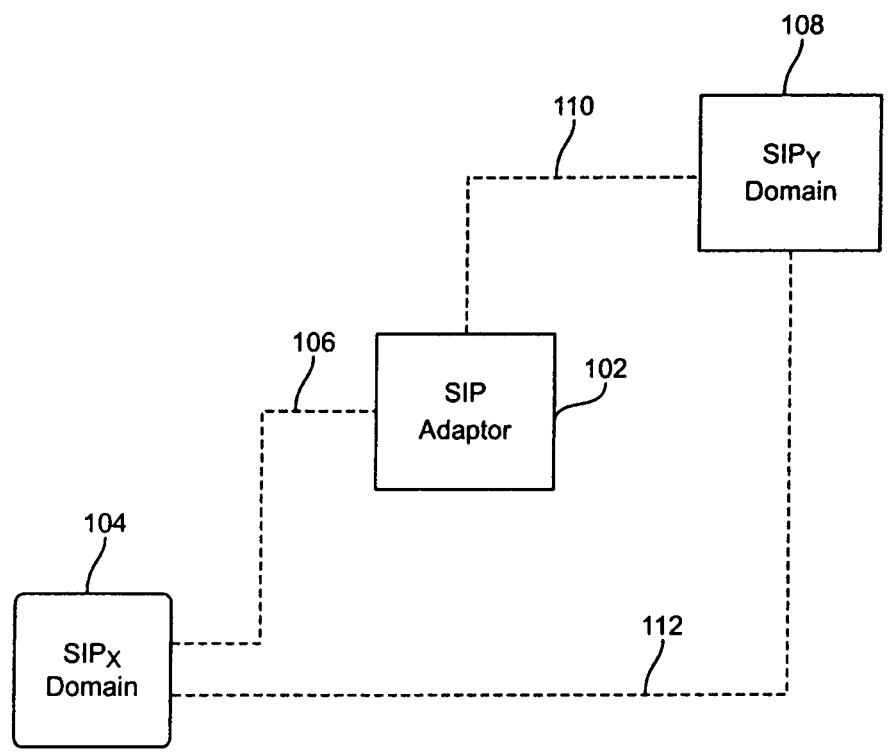
FIG. 2 is an illustration showing a SIP adaptor in communication with two SIP domains that implement dissimilar SIP message formats.

FIG. 2 shows a SIP adaptor 102 that communicates SIP messages 106, 110 to and from SIP servers in both the SIP$_X$ domain 104 and the SIP$_Y$ domain 108. The SIP adaptor 102 may modify the format of SIP$_X$ domain messages so they are compliant with the SIP$_Y$ domain 108. Alternatively, or in addition, the SIP adaptor 102 may modify the format of SIP$_Y$ domain messages so they are compliant with the SIP$_X$ domain 104. The SIP adaptor 102 modifies SIP messages and communicates with SIP servers in the SIP$_X$ and SIP$_Y$ domains 104, 108 to initiate a communication session between endpoints (not shown). Once the communication session is initiated, the endpoints may communicate by way of the IP or other data-oriented protocol 112. The SIP adaptor 102 may be a proxy server and/or other type of computer, circuit, logic, or any combination thereof configured to modify SIP messages.

Figure 3:
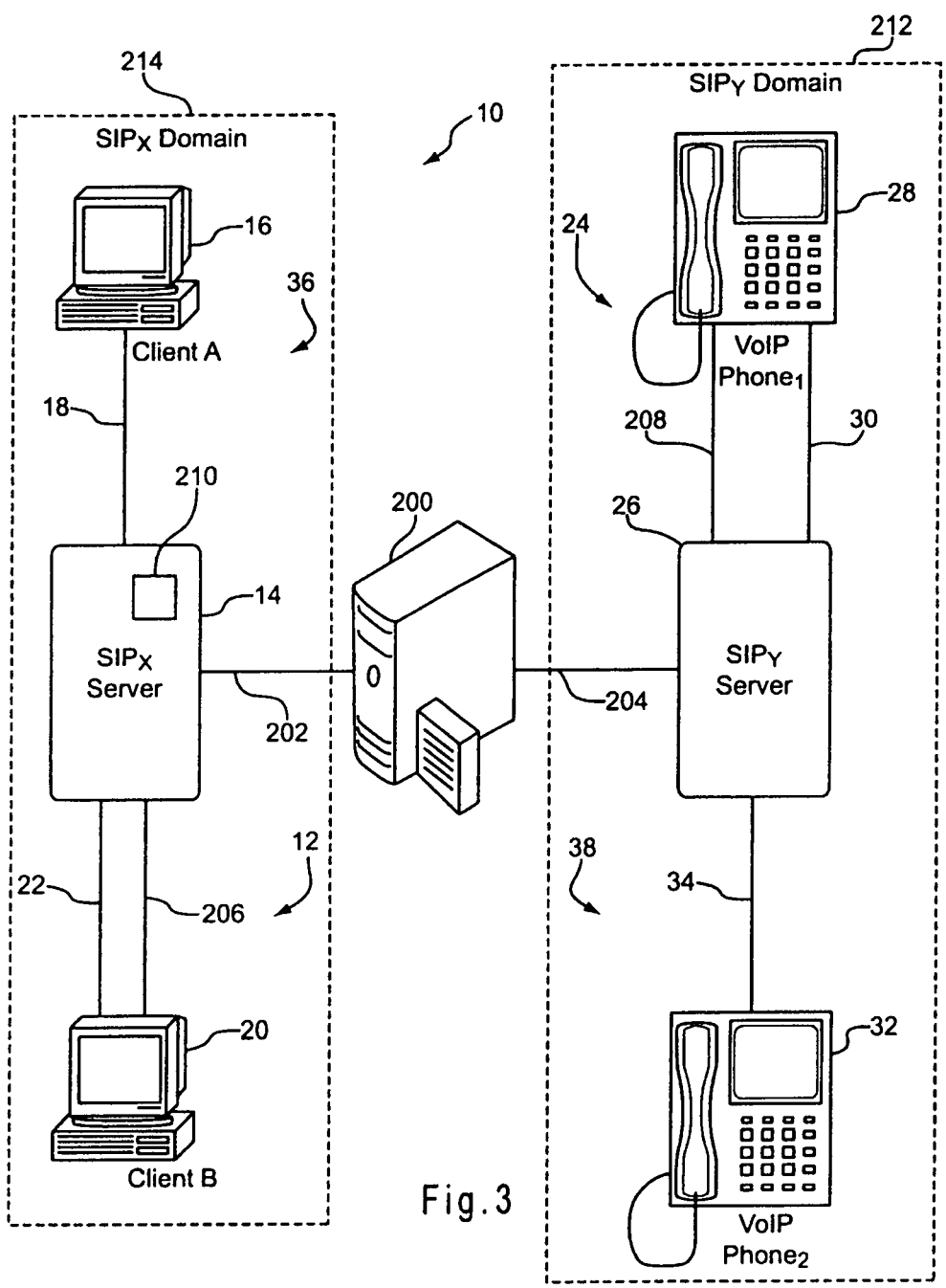
FIG. 3 is an illustration showing a SIP adaptor in communication with the SIP servers of FIG. 1.

FIG. 3 shows a SIP adaptor 200 in communication with the SIP servers 14 and 26 of FIG. 1. FIG. 3 is identical to FIG. 1, with the addition of the SIP adaptor 200 in communication with the SIP$_X$ server 14 and the SIP$_Y$ server 26 between the SIP$_X$ domain 214 and the SIP$_Y$ domain 212. The SIP adaptor 200 allows the SIP$_X$ server 14 and the SIP$_Y$ server 26 to initiate a communication session between either Client A 16 or Client B 20 and VoIP phone₁ 28 or VoIP phone₂ 32, or between any other endpoints in either SIP domain 214 or 212. By way of example, Client B 20 may initiate a VoIP telephone session with VoIP phone₁ 28 by sending a SIP invitation message 206 to the SIP$_X$ server 14. As explained below, the SIP$_X$ server 14 determines whether the SIP invitation message 206 is intended for an invitee in the SIP$_X$ domain. In this example, the SIP$_X$ server 14 determines that the message is not intended for an invitee in the SIP$_X$ domain, so the SIP$_X$ 14 server communicates the message to the SIP adaptor 200, using a SIP forwarding message 202. The SIP$_X$ server 14 may implement a filter 210 having a library of routing rules that identify (using, as examples, an Ethernet or IP address) the SIP adaptor serving the invitee. Table 1, below, shows an example routing table that the filter 210 may implement:

TABLE 1

SIP server routing table

| Invitee Domain | SIP adaptor |
|---|---|
| .domain_abc | SIP adaptor 1 |
| .domain_bca | SIP adaptor 2 |
| .domain_cab | SIP adaptor 1 |

As explained below, the SIP adaptor 200 utilizes the invitee information to determine whether the SIP invitation message is intended for an invitee in the SIP$_Y$ domain 212 or some other SIP domain. In this example, the SIP adaptor 200 determines that the SIP invitation message is intended for an invitee in the SIP$_Y$ domain 212. The SIP adaptor 200 modifies the format of the message so that the modified message is discernable in the SIP$_Y$ domain 212 and then communicates the modified message 204 to the SIP$_Y$ server 26. The SIP$_Y$ server 26 then communicates the modified message 208 to the invitee, the VoIP phone₁ 28. SIP dialog may continue between the Client B 20 and the VoIP phone₁ 28 by way of the SIP$_X$ server 14, SIP adaptor 200, and the SIP$_Y$ server 26 to initiate the communication session.

Figure 4:
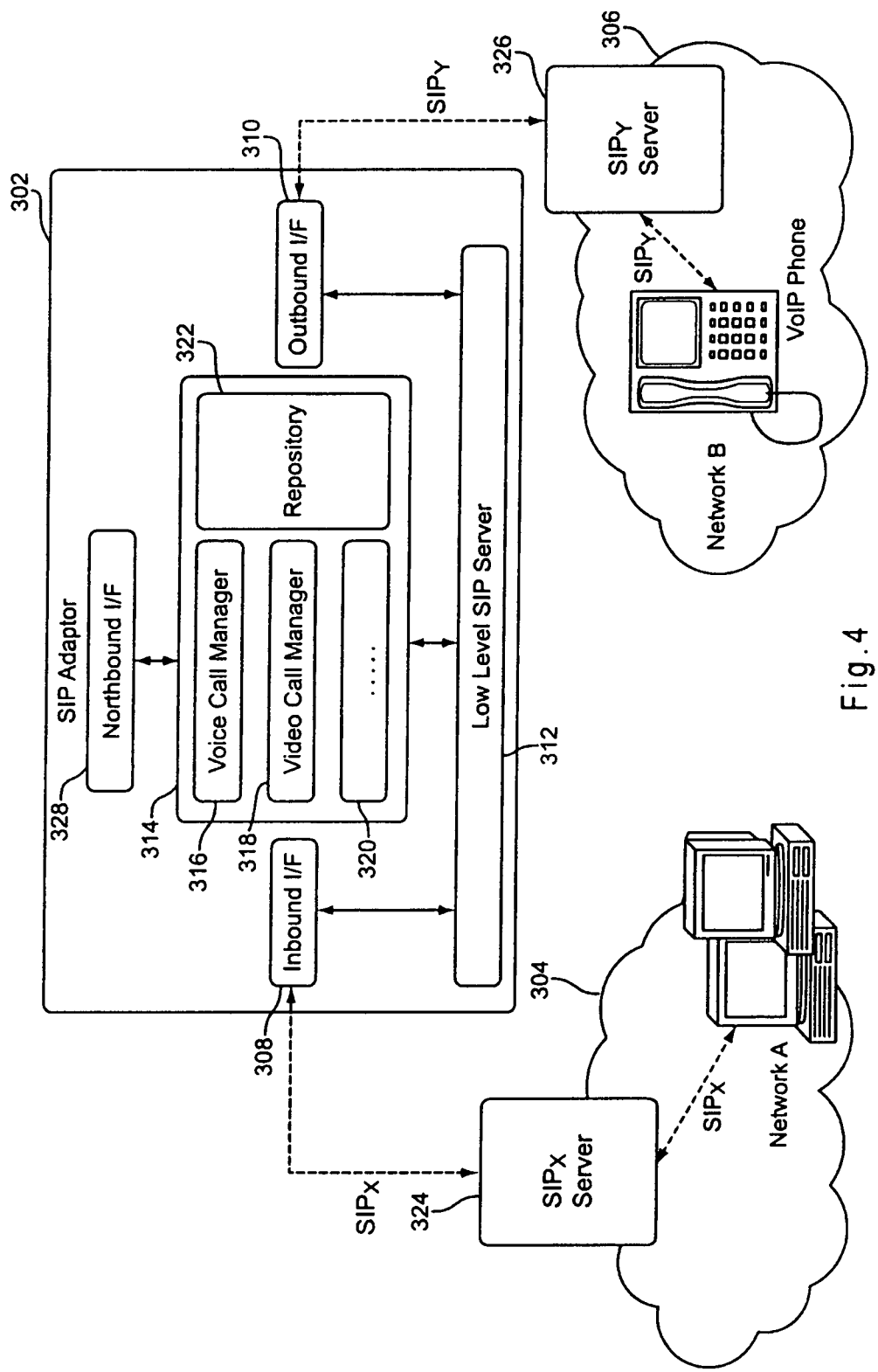
FIG. 4 is an illustration showing aspects of a SIP adaptor in communication with two SIP domains that have dissimilar SIP message formats.

FIG. 4 is an illustration of a SIP adaptor 302 in communication with two SIP servers, the SIP$_X$ server 324 and the SIP$_Y$ server 326, that have dissimilar SIP message formats (dissimilar SIP domains). The SIP$_X$ server 324 serves users in network A 304 and the SIP$_Y$ server 326 serves users in network B 306. Additional SIP servers (not shown) may be served by the SIP adaptor 302.

An inbound communication interface 308 includes logic to receive and send SIP$_X$ domain messages. The SIP$_X$ domain messages may be communicated on the transport layer implemented according to the Internet Protocol reference model, as an example. In one version, the logic is configured to receive and send SIP messages using the transmission control protocol (TCP/IP) on the transport layer. As an example, the Microsoft® Office Live Communication Server (LCS) communicates SIP messages on the TCP/IP layer.

An outbound communication interface 310 includes logic to receive and send SIP$_Y$ domain messages. The SIP$_Y$ domain messages may also be communicated on the transport layer implemented according to the Internet Protocol reference model. In one version, the logic is configured to receive and send SIP messages using the user datagram protocol (UDP) on the transport layer. As an example, a VoIP phone server may communicate SIP messages on the UDP layer.

A low level SIP server 312 functions as an intermediate interface between the inbound interface 308, the outbound interface 310, and a core 314. The low level SIP server 312 decodes SIP messages received on the inbound interface 308 and the outbound interface 310, extracts variables and parameters carried within the SIP messages, and provides SIP data to the core 314. The low level SIP server 312 also receives modified SIP data structures from the core 314, encodes SIP messages, and sends the encoded SIP messages to the inbound interface 308 and the outbound interface 310. In one version, the low level SIP server 312 is a BEA WebLogic® SIP Server developed on the Java Specification Request (JSR) 116 specification.

The core 314 modifies the SIP messages from the SIP$_X$ domain to the SIP$_Y$ domain and/or from the SIP$_Y$ domain to the SIP$_X$ domain. In one version, the core 314 implements a transformation protocol to modify the format of a SIP message to conform to the domain of the SIP server receiving the SIP message. The transformation protocol may remove parameters (such as media types) that are not recognizable by a SIP server and may modify additional or other aspects of the SIP message so that the message complies with the target SIP format. The transformation process may transform SIP message parameters such as usernames, domains, IP addresses, media types, coding data, and media initialization parameters. The specific aspects that are modified between any two (or more) SIP domains may be defined in a repository 322 that stores rules, such as transformation and format rules, that govern how an origin SIP format maps to a target SIP format (e.g., transformation rules that specify parameter deletion, insertion, or modification to covert from a SIP$_X$ message to a SIP$_Y$ message).

Alternatively or in addition to any of the above, the transformation protocol may modify other aspects of the SIP message so that the message complies with the messaging format of the second SIP server. There are various types of transformations that may be carried out for modifying a SIP message. In some cases, a single transformation may be all that is necessary. In other cases, two or more transformations may be implemented. The various types of transformations include adding data fields (i.e., any part of the SIP message) to the SIP message and/or deleting data fields from the SIP message. Data fields may be converted, expanded, and/or truncated. Data fields may be added around other data fields, shortened, and/or lengthened. A transformation may also include changing the encoding format of the SIP message, removing the encoding, or performing some other action.

Figure 5:
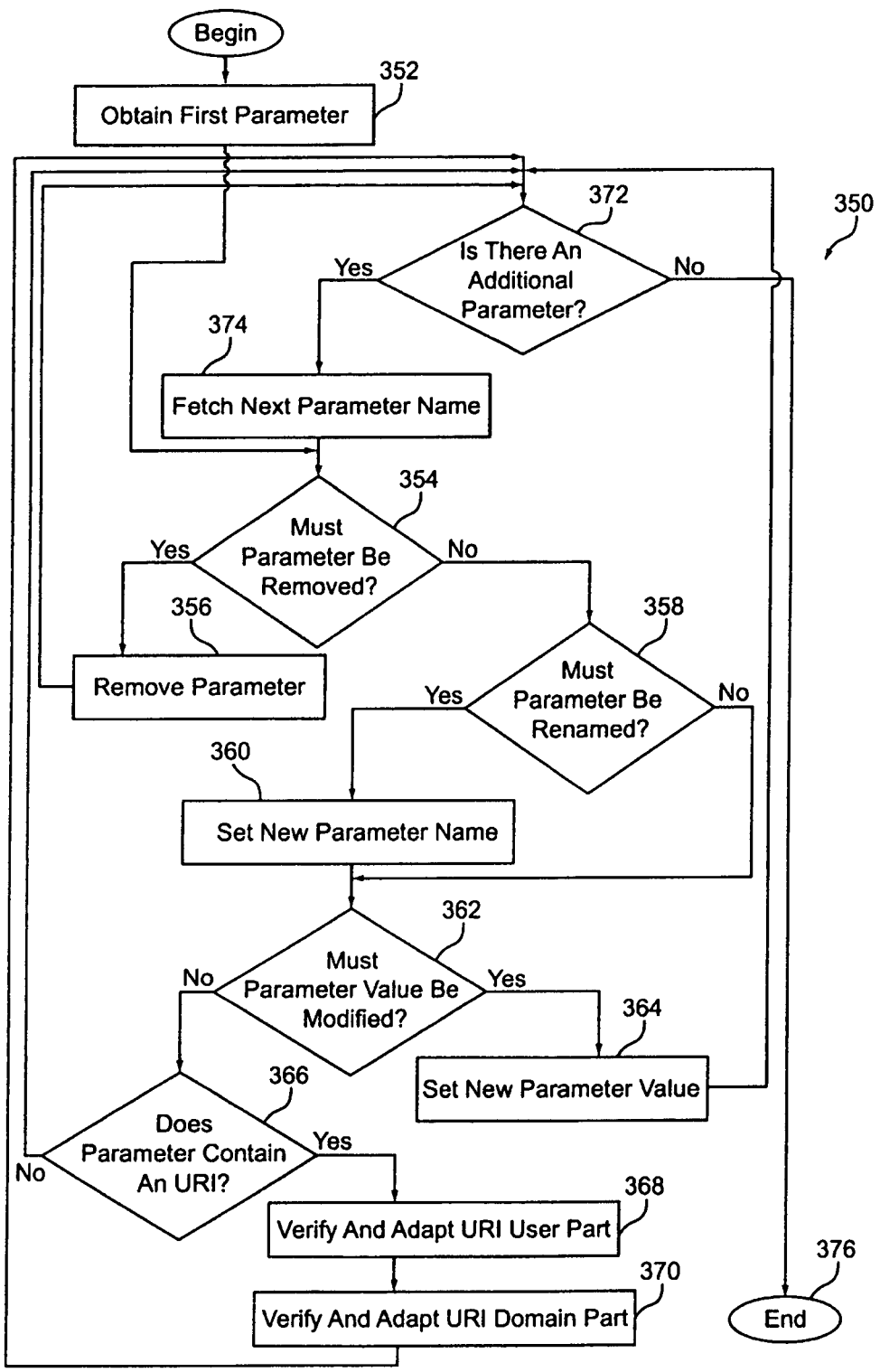
FIG. 5 is a flowchart showing a version of a protocol transformation process that may be performed by a SIP adaptor to modify fields in a SIP message.

FIG. 5 is a flowchart showing a version of a protocol transformation process 350 that may be performed by the core 314. The core 314 obtains the first parameter (352) from the SIP message and determines, based upon data obtained from the repository 322, if the parameter is to be removed (354). If the parameter is to be removed the core 314 removes the parameter (356) and then determines if there is another parameter (372). If the first parameter is not to be removed, the core 314 determines if the parameter is to be renamed (358). If so, the parameter is renamed (360) according to the domain of the SIP server that is to receive the SIP message.

The core 314 also determines if a parameter must be modified (362). If so, a new parameter value is set (364) and the core 314 determines whether there is an additional parameter (372). If the parameter is not to be modified, the core 314 determines if the parameter contains a uniform resource identifier (URI) (366). If the parameter does not contain a URI, the core 314 determines if there is an additional parameter (372). If the parameter contains a URI, the core 314 verifies and adapts the username (368) and domain (370) for the receiving SIP server, as explained below. The core 314 repeats (354-374) until there are no additional parameters (376).

The core 314 may include modules dedicated to managing SIP messages related to specific call types, such as a voice call manager module 316, a video call manager module 318, and/or other modules 320. These dedicated modules apply modifications to SIP messages to enable a specific type of call. For example, a voice call initiated by the SIP$_X$ server 324 may specify an audio codec Cx that must be replaced by an audio codec Cy1 for recognition by the SIP$_Y$ server 326 for a voice call. However, the same audio codec Cx may need to be replaced by an audio codec Cy2 for recognition by the SIP$_Y$ server 326 for a video call. In this example, the former adaptation is managed by the voice call manager module 316, while the latter is managed by the video call manager module 318.

The core 314 may be a processor such as a microprocessor, a microcontroller, a digital signal processor, an application specific integrated circuit (ASIC), discrete logic, or a combination of those and/or other types of circuits and logic.

As mentioned above, the specific aspects of a SIP message that are to be modified may be stored in a repository 322. The repository 322 may store information about clients of either or both SIP servers SIP$_X$ 324 and SIP$_Y$ 326, including message format rules for each client. A message format rule may include parameters used to match an incoming message to a list of properties and actions to be taken. The actions specify if a property has to be removed, modified or added. The repository 322 may store additional information, such as information for mapping each client to a specific calling line identifier (CLI). A CLI may include the client's user identification (in the form of "user@domain"), for example.

In one version, the repository 322 may store a table mapping user/client identities to specific SIP servers. Table 2, below shows an example of the mapping table:

TABLE 2

| Mapping user/client identity to SIP server | |
|---|---|
| User/Client Identity | SIP server |
| UserA@domain1 | SIP server 1 |
| UserB@domain1 | SIP server 1 |
| UserC@domain2 | SIP server 2 |
| UserD@domain3 | SIP server 3 |

The SIP adaptor 302 references the user/client identities in the repository 322 to locate the SIP server that is to receive the modified SIP message.

The SIP adaptor 302 may optionally include a northbound interface 328 to manage integration with external systems that provide assurance, provisioning, and presence information, as examples.

Figure 6:
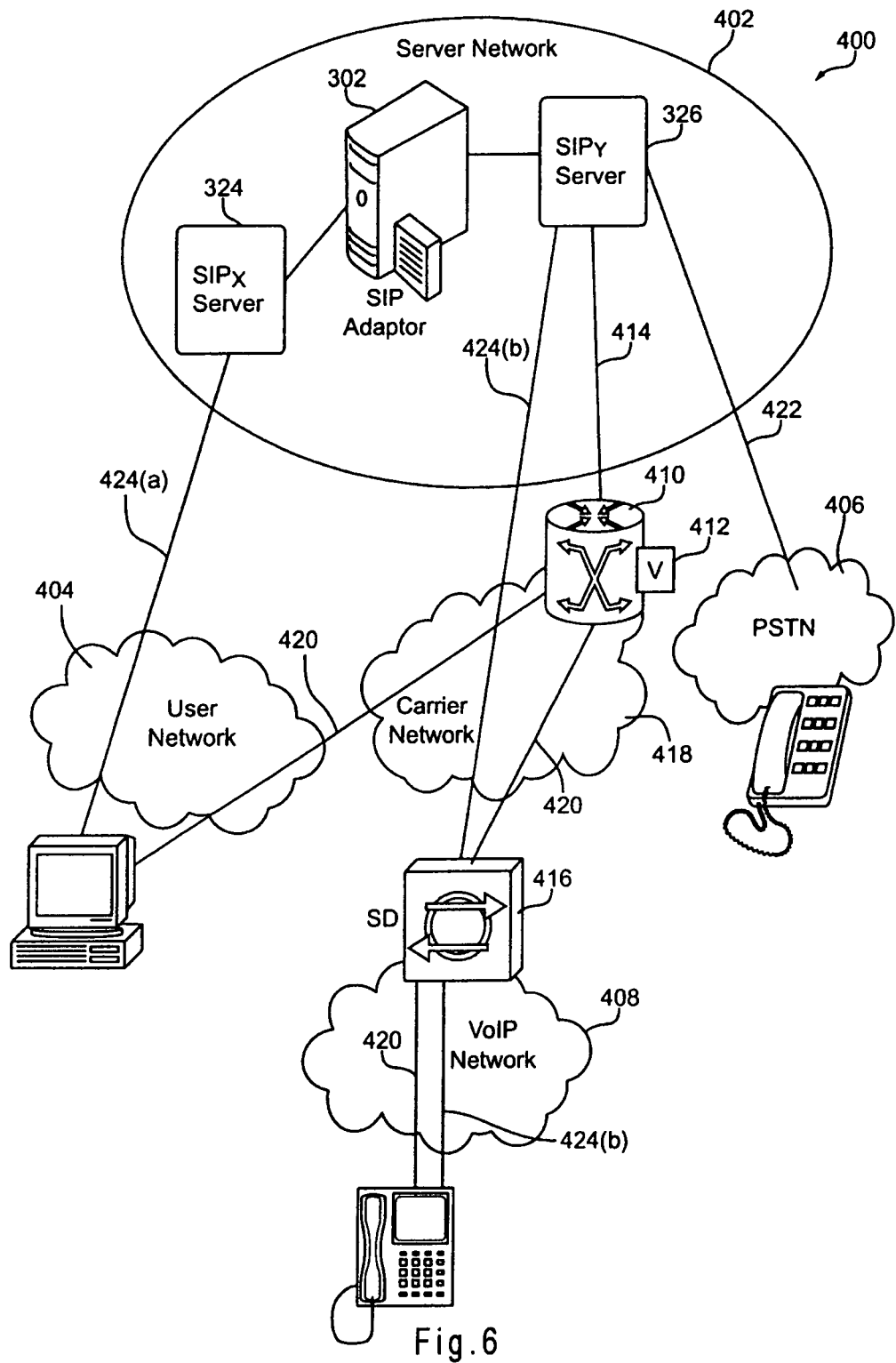
FIG. 6 is an illustration of a server network having a SIP adaptor.

FIG. 6 is an illustration of a network scenario 400 having a server network 402 that includes a SIP adaptor 302, such as described with reference to FIG. 4. The SIP adaptor 302 may have configurations other than that shown in FIG. 4.

The network scenario 400 includes a user network 404 having clients served by the SIP$_X$ server 324 and user networks 406 and 408 having clients served by the SIP$_Y$ server 326. The SIP$_X$ server 324 and the SIP$_Y$ server 326 communicate SIP messages 424(a) and 424(b) to user networks 404 and 408, respectively. In the illustrated version, the SIP$_Y$ server 326 also communicates Integrated Service Digital Network (ISDN) user messages to user network 406. The user network 404 may be an integrated enterprise application, such as Microsoft® Office Communicator, the user network 406 may be a public switched telephone network (PSTN), and the user network 408 may be a VoIP network, as examples.

In one version, the SIP$_Y$ server functions as a soft-switch, implements RFC 3261 standard interfaces, and includes media gateway controller and signaling gateway functionalities. The media gateway controller functionalities control media gateways and voice calls over PSTN 406. In one version, the media gateway controller functionalities implement the media gateway control protocol (MGCP) to control PSTN 406 voice calls.

In the illustrated version, the SIP$_Y$ server 326 communicates with a router 410 having a media gateway 412 to perform the inter-working between the circuit and the packet networks. The media gateway 412 may be controlled by the media gateway controller functionalities of the SIP$_Y$ server 326 by way of the MGCP 414, H.248 protocol, or other signaling protocol.

The sessions director (SD) 416 is a gateway that separates the VoIP network 408 from the carrier network 418. The SD 416 manages network address translation (NATing) for the VoIP network 408, performs NAT transversal of SIP messages, and implements real-time transfer protocol (RTP) 420 for audio and video packets.

Figure 7:
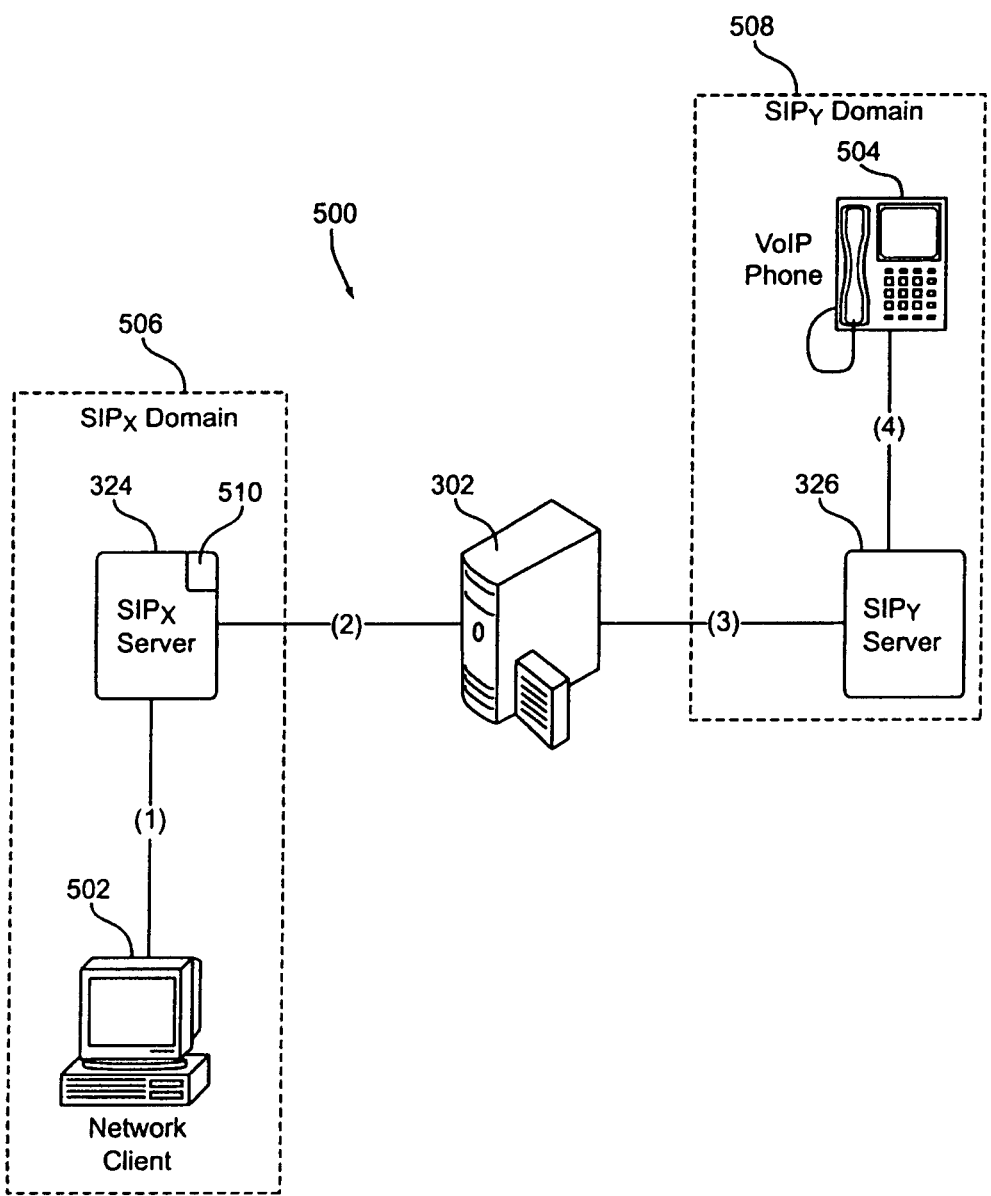
FIG. 7 is an illustration of SIP messaging through a SIP adaptor between an initiator and invitee in dissimilar SIP domains.

FIG. 7 is an illustration of SIP messaging 500 through the SIP adaptor 302 of FIG. 4 between an initiator 502 and an invitee 504 in dissimilar SIP domains 506 and 508. The SIP domains 506 and 508 are served by their respective SIP servers. The SIP$_X$ domain 506 is served by the SIP$_X$ server 324, and the SIP$_Y$ domain 508 is served by the SIP$_Y$ server 326.

To initialize a call between the initiator 502 and the invitee 504, the initiator 502 sends a SIP initiation message (1) to the SIP$_X$ server 324. An exemplary SIP initiation message is shown below in Table 3.

TABLE 3

| Initiation Message Fields | |
|---|---|
| Invite Field | 01122334455@SIPX.abc.com |
| From Field | mjones@cbc.com |
| To Field | 01122334455@SIPX.cbc.com |
| Content Field | SDP parameters |

The "invite" field contains the invitee's URI for identifying the invitee. The "from" field contains the initiator's URI for identifying the initiator. The "to" field contains the contact address for contacting the invitee. The contact address may be different from the invitee's URI in some cases, such as if the invitee's identification is different than the invitee's contact address and/or if the invitee has more then one contact address. In general, the URI as an identifier is a username with or without a domain name, or a telephone number (e.g., 01122334455).

The $SIP_X$ server 324 receives the initiation message (1) and references a registrar database 510. The registrar database 510 may be integrated inside the SIP server (as shown) or external thereto. The registrar database 510 has a list of users that are registered in network A 304 (and within any other networks served by the $SIP_X$ server 324). The registrar database 510 also includes at least one contact address for each registered user.

The $SIP_X$ server 324 may execute a database query using, for example, the username part or domain part of the invitee's URI. If the invitee is within the domain of the $SIP_X$ server 324, the query will return information indicating so. The information may include additional identification information pertaining to the invitee to be used to communicate to the invitee. Thus, if the URI is registered, the $SIP_X$ server 324 assumes SIP messaging between the initiator and the invitee.

The "content" field contains the media parameters needed to initiate the media session. For example, a media parameter may indicate a list of codecs supported by the initiator. Codecs are algorithms that are used to compress and transport media flow (e.g. voice or video data) over the IP network. Examples of codecs are the G.711 and G.729 standards supported by the International Telecommunication Union. Codecs are included in the invite messages so that the initiator 502 and invitee 504 can select a mutual codec for the media session. The selected codec will be one that is supported by both the initiator 502 and invitee 504.

If a user is not registered and/or does not belong to the network served by the $SIP_X$ server 324, the $SIP_X$ 324 routes the SIP initiation message (1) to the SIP adaptor 302 for SIP field manipulation. The forwarded SIP message (2) is typically identical to the SIP initiation message (1), but need not be. Table 4 shows an example of SIP fields in a SIP message that is sent to the SIP adaptor 302. In this example, the domain name in the invite field has been changed from SIPX.abc.com to 192.156.0.60 based on information retrieved from the registrar database 510.

TABLE 4

| To SIP Adaptor Message Fields | |
|---|---|
| Invite Field | 01122334455@192.156.0.60 |
| From Field | mjones@cbc.com |
| To Field | 01122334455@SIPX.cbc.com |
| Content Field | SDP parameters |

The SIP adaptor 302 modifies specific URIs in the invitation message (the "invite", "from", and "to" fields) to parameters that are recognizable in the invitee's network (network B 306) and in the $SIP_Y$ domain 508. Table 5 shows an example of fields that have been modified by the SIP adaptor 302.

TABLE 5

| From SIP Adaptor Message Fields | |
|---|---|
| Invite Field | 01122334455@131.132.186.4 |
| From Field | 01122334777@192.156.0.60 |
| To Field | 01122334455@131.132.186.4 |
| Content Field | modified SDP parameters |

In this example, both the username and domain fields have been modified to a format that is recognizable in network B 306, replacing the addresses and logical names that are valid in network A 304. Domain addresses belong to the networks and are therefore modified to match the respective network requirements. In this example, the domain address is modified to match network B 306 requirements. Usernames, on the other hand, belong to the SIP domain, so they are modified to match the $SIP_Y$ domain 508. Table 5 also shows an example of modifying the user identifier in the "from" field from a logical name, which is valid only within the $SIP_X$ domain 506, to a telephone number that is valid in the $SIP_Y$ domain 508. The repository 322 stores the rules for modifying the invitation message URI's between network A 304 and network B 306. Ideally, the repository 322 will be programmed with all of the rules required to support the transformation of SIP messages between the two networks. The URI's are thus modified by the SIP adaptor 302 to allow the correct routing of the invitation message in network B 306. A URI and/or parameter will not bet modified if the repository 322 does not contain a corresponding modification rule.

The SIP adaptor 302 may also modify the SDP content of the SIP message to provide a modified SIP message that is compliant with the SDP format accepted by the $SIP_Y$ server 326. Some media types may be removed from the SDP part of the SIP message and/or other changes may be made as discussed above with reference to FIG. 5. After the SIP message has been modified, the SIP adaptor 302 routes the invitation message (3) to the $SIP_Y$ server 326. The $SIP_Y$ server 326 forwards the modified SIP message (which the $SIP_Y$ server 326 understands because of the adaptation in the SIP adaptor 302) to the invitee 504 at (4) based on an internal routing table.

Figure 8:
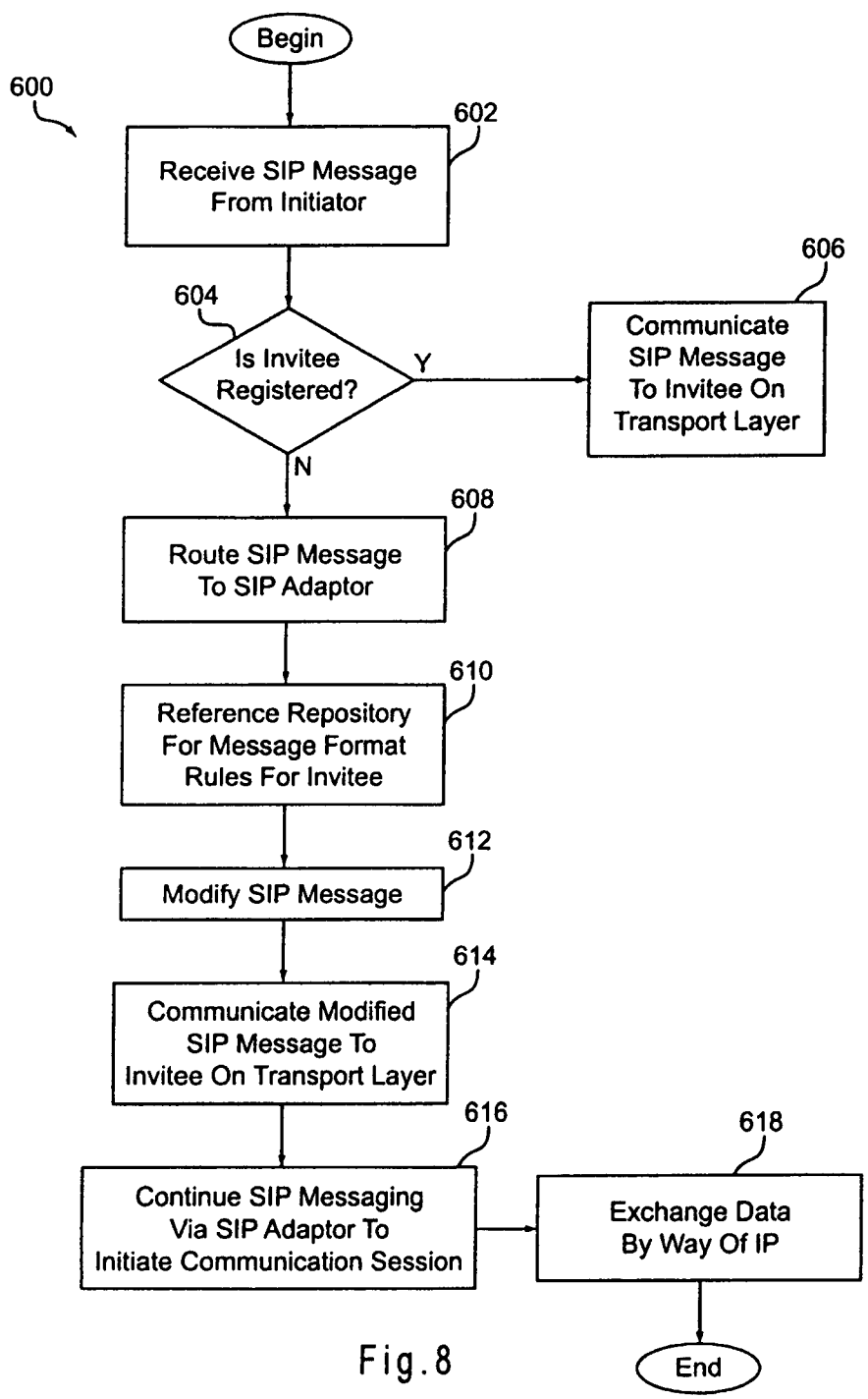
FIG. 8 shows acts that a server network may take to initiate a communication session between an initiator and an invitee.

FIG. 8 shows processing flow 600 that a server network may implement to initiate a communication session between an initiator and an invitee. A SIP server receives a SIP message from a client (602). The SIP message is sent to establish a communication session with an invitee. The SIP server references the invitee SIP URI specified in the "invite" and "to" fields to determine if the invitee is registered (604), i.e. if the invitee is currently present and able to receive SIP calls within its domain. If the invitee is registered, the SIP server communicates the SIP message to the invitee (606).

If the invitee is not registered, the SIP server routes the SIP message to a SIP adaptor (608). The SIP adaptor receives the SIP message and, based on the invitee's domain, references a repository for message format rules (610). The SIP adaptor modifies the SIP message based on the message format rules so that the SIP message is discernable by the SIP server for the invitee's domain (612). An example of a modification process is shown in FIG. 5. The SIP adaptor communicates the modified SIP message to the SIP server for the invitee, and the SIP server communicates the modified SIP message to the invitee (614). SIP messaging may continue, with the SIP adaptor modifying SIP messages between the initiator's SIP server and the invitee's SIP server, until the communication session can be established (616). Once a communication session is established, the initiator and the invitee directly communicate media data using the IP or other protocol (618).

All of the discussion above, regardless of the particular implementation being described, is exemplary in nature, rather than limiting. For example, although selected aspects, features, or components are depicted as being implemented in a server, all or part of the systems and methods consistent with the SIP adaptor may be stored on, distributed across, or read from other machine-readable media, for example, secondary storage devices such as hard disks, floppy disks, and CD-ROMs; a signal received from a network; or other forms of ROM or RAM either currently known or later developed.

The logic described above may reside in the same or different threads, fibers, or other ways of organizing code and data within a process. Further, although certain logic may interact through a function call mechanism, other communication methods are possible including message passing, mutex or semaphore based systems, or by other communication techniques.

Specific components of the system may include additional or different components. A server may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   receiving a session initiation message for a user in a domain, wherein the session initiation message adheres to a format of a first messaging domain;
   determining that the user does not belong to the first messaging domain and responsively referencing a library of routing rules to identify a session initiation protocol adaptor that serves the user;
   routing the session initiation message to the identified session initiation protocol adaptor; and
   modifying the session initiation message from the format of the first messaging domain to a format of a second messaging domain.

2. The method of claim 1 comprising accessing a transformation protocol for modifying the session initiation message.

3. The method of claim 1 wherein the format of the first messaging domain is implemented by a first SIP server, and the format of the second messaging domain is implemented by a second SIP server.

4. The method of claim 1 comprising modifying a parameter of the session initiation message.

5. The method of claim 1 comprising removing a parameter of the session initiation message.

6. The method of claim 1 wherein modifying the session initiation message comprises modifying an identifier field.

7. The method of claim 1 wherein the first messaging domain is in an integrated enterprise domain and the second messaging domain is in a Voice over Internet Protocol (VoIP) domain.

8. The method of claim 1 wherein modifying the session initiation message is based upon information retrieved from a database that maps a domain name to the second messaging domain.

9. The method of claim 1 comprising communicating the modified session initiation message to a proxy server.

10. A computer program product comprising instructions on a non-transitory computer-readable storage medium, the instructions executed by a computer causing the computer to receive a session initiation message for a user in a domain, wherein the session initiation message adheres to a format of a first messaging domain, determines that the user does not belong to the first messaging domain and responsively references a library of routing rules to identify a session initiation protocol adaptor that serves the user, and routes the session initiation message to the identified session initiation protocol adaptor.

11. The computer program product of claim 10 having processor executable instructions to access a transformation protocol for modifying the session initiation message.

12. The computer program product of claim 10 having processor executable instructions to modify a parameter of the session initiation message.

13. The computer program product of claim 10 having processor executable instructions to remove a parameter of the session initiation message.

14. The computer program product of claim 10 having processor executable instructions to modify the session initiation message based upon information retrieved from a database that maps a domain name to the second messaging domain.

15. The computer program product of claim 10 having processor executable instructions to modify an identifier field in the session initiation message.

16. An apparatus comprising:
    an interface to receive a session initiation protocol message for a user in a domain, wherein the session initiation protocol message adheres to a format of a first messaging domain;
    a first processor to determine that the user does not belong to the first messaging domain, responsively reference a library of routing rules to identify a session initiation protocol adaptor that serves the user, and route the session initiation message to the identified session initiation protocol adaptor; and
    a second processor to modify the session initiation protocol message from the format of the first messaging domain to a format of a second messaging domain.

17. The apparatus of claim 16 further comprising a database having at least one client domain name mapped to at least one format rule, wherein the second processor modifies the session initiation protocol message in accord with the format rule.

18. The apparatus of claim 16 further comprising:
    a first interface to receive the session initiation protocol message from a first session initiation protocol server; and a second interface to communicate the modified session initiation protocol message to a second session initiation protocol server.

19. The apparatus of claim 16 wherein the second processor implements a protocol transformation process to modify parameters of the session initiation protocol message.

20. The apparatus of claim 16 further comprising:
a first session initiation protocol server in communication with the second processor; and
a second session initiation protocol server in communication with the second processor; wherein the first session initiation protocol server and the second session initiation protocol server implement different message formats.

* * * * *